Figure 1:
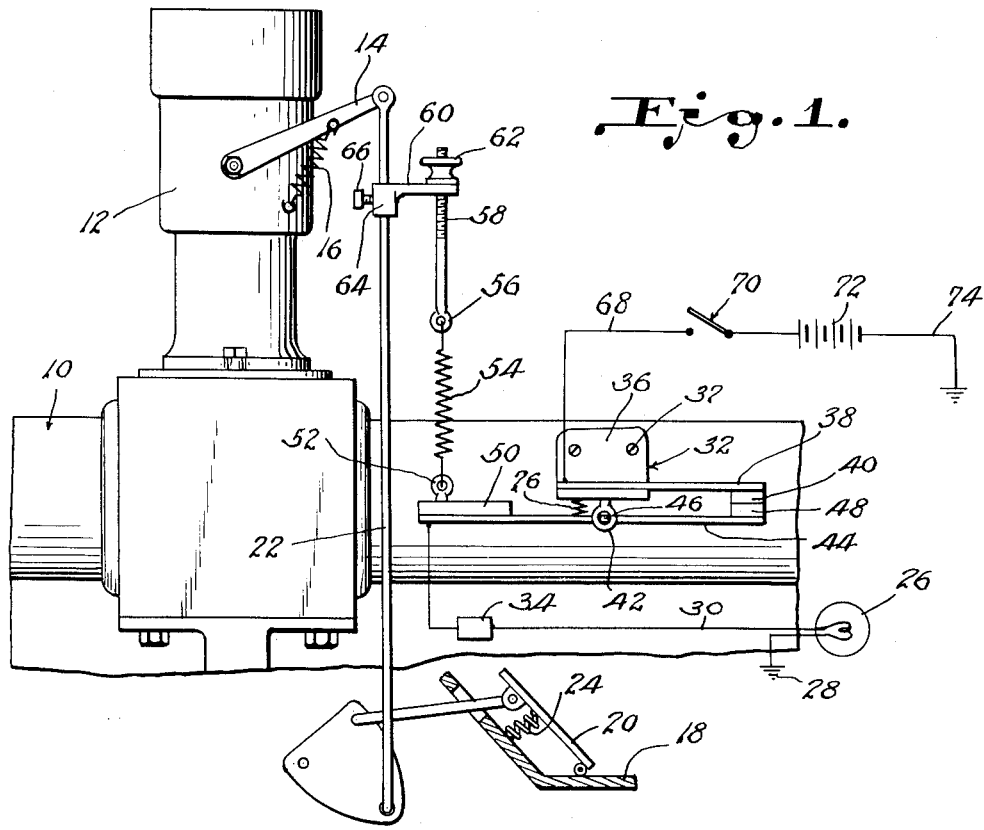

Feb. 7, 1956 T. G. PERRY 2,734,105
SIGNAL FOR AUTOMATICALLY WARNING THE DRIVER OF A TRAILING
VEHICLE THAT THE SPEED OF A LEADING
VEHICLE IS BEING RETARDED
Filed Feb. 20, 1952

T. G. Perry
INVENTOR

BY *CA Snow & Co.*
ATTORNEYS.

2,734,105

SIGNAL FOR AUTOMATICALLY WARNING THE DRIVER OF A TRAILING VEHICLE THAT THE SPEED OF A LEADING VEHICLE IS BEING RETARDED

Thomas G. Perry, Fair Haven, Vt.

Application February 20, 1952, Serial No. 272,616

1 Claim. (Cl. 200—61.89)

This invention relates to an automatic signalling device for warning the driver of a trailing vehicle that the speed of a leading vehicle is being retarded and has for its primary object to indicate to the driver of a trailing vehicle the retardation of the speed of a leading vehicle prior to the application of braking force to the leading vehicle.

It frequently happens that the driver of a vehicle will slow down without ever actually applying braking force to his vehicle. As a consequence, the usual stop lights carried by the leading vehicle will remain inoperative with the result that the driver of a trailing vehicle unaware of the reduction of speed of the leading vehicle will frequently approach dangerously close to the leading vehicle even to the extent of causing damage to one or both of the vehicles.

Another object of this invention is to avoid or at least reduce to a minimum the danger of injury to person and property through the contact of a trailing vehicle with a leading vehicle.

The above and other objects may be attained by employing this invention which includes among its features a signal lamp mounted on a vehicle and visible from the rear thereof, an on and off switch mounted on the intake manifold of the vehicle and electrically connected to the lamp, and a yielding connection operatively connected to the on and off switch and with the linkage of the vehicle through which the throttle valve is controlled for moving the on and off switch to on position when the driver of the leading vehicle removes his foot from the accelerator pedal or otherwise permits the accelerator pedal to move to a position in which the throttle valve of the vehicle is substantially closed.

Other features include a manually actuated cut out switch in the circuit between the on and off switch and the signal lamp by which the signal lamp may be rendered inoperative, and a flasher connected in the circuit between the on and off switch and the signal lamp for causing the signal lamp to blink in order to distinguish it from the conventional stop light.

Figure 2:
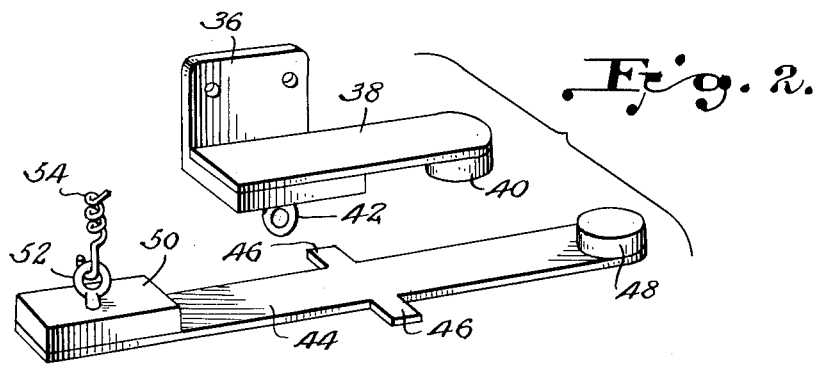

In the drawings,

Fig. 1 is a schematic view illustrating diagrammatically the application of this invention to a conventional motor driven vehicle, and Fig. 2 is an exploded perspective view of the on and off switch.

Referring to the drawings in detail a motor driven vehicle having a conventional intake manifold 10 has connected to the manifold a conventional carburetor (not shown) through a conventional throttle valve 12 having a control lever 14. The throttle valve 12 is yieldingly held in substantially closed position by a conventional spring 16 which as illustrated in Fig. 1 may be connected to the lever 14 and to the body of the throttle valve 12 to exert pull on the lever in a direction to close the throttle valve. Vehicles of the type to which this invention relates are conventionally provided with a floor board 18 on which is mounted for rocking movement an accelerator pedal 20 which is connected through a conventional linkage 22 to the lever 14 of the throttle valve so that as the pedal 20 is depressed against the effort of a conventional compression coil spring 24 interposed between it and the floor board, the throttle valve 12 will be moved to open position. The structure so far described is conventional and forms no part of this invention.

Mounted on the vehicle at a suitable location where it will be visible from the rear of the vehicle is a signal lamp 26, one terminal of which is conventionally grounded as at 28 while its opposite terminal is connected through a conductor 30 to an on and off switch designated generally 32. In the preferrred form of the invention a conventional flasher 34 is connected to the conductor 30 between the switch 32 and the lamp 26 so that when the switch is closed, the lamp will be intermittently energized to produce a visible flashing thereof.

The on and off switch 32 above referred to comprises an angle bracket 36 preferably of non-conducting material which is connected as by screws 37 to the manifold 10 adjacent the linkage 22. The bracket 36 carries a contact arm 38 of conducting material which extends horizontally from the bracket 36 and carries remote from the bracket a depending contact 40. Carried by the underside of the horizontal leg of the angle bracket 36 and electrically isolated from the contact arm 38 are laterally spaced eyes 42, the axes of which align. Mounted for rocking movement in the eyes 42 about the common axis along which they align is a rocking arm 44 of conducting material which as shown in Fig. 2 is provided oppositely extending ears 46 which extend through the eyes 42 to rockably support the arm 44 on the bracket 36. A contact member 48 is carried by the rocking arm 44 adjacent one end thereof for movement into and out of engagement with the contact 40 according to the position of the arm 44. Carried by the arm 44 adjacent the end thereof remote from the contact 48 is a block 50 of non-conducting material carrying an upwardly extending eye 52 which is electrically isolated from the rocking arm 44 and has connected thereto one end of a retractile coil spring 54. The opposite end of the coil spring 54 is connected to an eye 56 carried by one end of an externally screw threaded rod 58 which extends upwardly through the bracket arm 60 and has threadedly engaged therewith a nut 62 by means of which the tension of the spring 54 may be regulated. The bracket arm 60 above referred to is provided with a socket 64 having a bore which extends therethrough for the reception of an element of the linkage 22 which is connected to the lever 14 of the throttle valve 12. In the preferred form of the invention a set screw 66 extends through a threaded opening with which it is threadedly engaged and impinges upon the element of the linkage 22 which extends through the socket 64 in order to adjustably support the bracket 60 on the linkage.

As illustrated in Fig. 1 the terminal of the conductor 30 remote from that which is connected to the lamp 26 is electrically connected to the arm 44 while a conductor 68 is electrically connected to the arm 38 to one terminal of a cut out switch designated generally 70, the opposite terminal of which is connected to a suitable source of electrical energy 72 which may be the conventional battery carried by the ordinary vehicle. The opposite terminal of the source of electrical energy 72 is grounded through a conductor 74 as will be readily understood so that when the cut out switch 70 is in on position and the on and off switch 32 is in on position, electrical energy will flow through the signal lamp 26.

In use it will be understood that with the cut out switch 70 closed, the signalling device will be in operative condition so that when the accelerator pedal 20 is depressed against the effort of the spring 24 to open the throttle valve 12, pull will be exerted on the spring 54 to rock the arm 44 about the common axis and move the contact 48 out of engagement with the contact 40. So long as pressure remains on the accelerator pedal 20, no energy will flow to the lamp 26 but as soon as the operator of the vehicle removes the pressure from the accelerator pedal 20, the linkage 22 will move to close the throttle valve 12 and relieve the tension on the spring 54 so as to permit the arm 44 to rock under the influence of the spring 76 and advance the contact 48 into engagement with the contact 40 to illuminate the lamp 26. In this way the operator of a trailing vehicle will be notified automatically that the operator of a leading vehicle is slowing down and the speed of the leading vehicle is being retarded.

While the foregoing there has been shown and described the preferred embodiments of this invention it is to be understood that minor changes in the details of construction combination and arrangement of parts may be resorted to without departing from the spirit and scope of the invention as claimed.

What is claimed is:

In a vehicle having an accelerator pedal and a linkage between said pedal and the carburetor butterfly valve and with a signal circuit and a lamp and flasher in the circuit; a warning signal operating means comprising a switch formed of a fixed contact, a rock lever pivoted between the ends thereof, a contact on one end of said lever confronting said fixed contact, a bracket arm formed with a boss through which said linkage extends, means adjusting said arm on said linkage, a bolt extending loosely through said arm, an eye on one end of said bolt, a lever tensioning spring connected between said eye and the other end of said lever, a spring tensioning nut threaded on said bolt and bearing against said bracket.

References Cited in the file of this patent
UNITED STATES PATENTS

| 1,769,704 | McCarron | July 1, 1930 |
| 1,785,366 | Shoenberg et al. | Dec. 16, 1930 |
| 1,861,101 | St. George | May 31, 1932 |
| 1,927,322 | Peacock | Sept. 19, 1933 |
| 1,956,056 | Bellec et al. | Apr. 24, 1934 |
| 2,096,069 | Seiden | Oct. 19, 1937 |
| 2,128,769 | Finnell | Aug. 30, 1938 |
| 2,276,378 | Duguay | Mar. 17, 1942 |
| 2,526,611 | Rodrick | Oct. 17, 1950 |
| 2,552,665 | Cirone | May 15, 1951 |
| 2,650,963 | Graveno | Sept. 1, 1953 |
| 2,685,048 | Schweitzer | July 27, 1954 |